US006330017B1

(12) United States Patent
Suzuki

(10) Patent No.: US 6,330,017 B1
(45) Date of Patent: Dec. 11, 2001

(54) LIGHT EMITTING DIODE ARRAY HEAD INCLUDING FOCUSING LENSES

(75) Inventor: Seizou Suzuki, Yokohama (JP)

(73) Assignee: Ricoh Co., Ltd., Tokyo (JP)

( * ) Notice: Subject to any disclaimer, the term of this patent is extended or adjusted under 35 U.S.C. 154(b) by 953 days.

(21) Appl. No.: 08/542,323

(22) Filed: Oct. 12, 1995

(30) Foreign Application Priority Data

Oct. 12, 1994 (JP) .................................................... 6-246139

(51) Int. Cl.$^7$ ................................ B41J 2/45; B41J 15/14; B41J 27/00
(52) U.S. Cl. ............................................ 347/238; 347/244
(58) Field of Search .................................... 347/238, 240, 347/244, 241

(56) References Cited

U.S. PATENT DOCUMENTS

| 5,023,442 | * | 6/1991 | Taniguchi et al. | 347/137 |
| 5,444,520 | * | 8/1995 | Murano | 347/244 |
| 5,475,416 | * | 12/1995 | Kessler et al. | 347/244 |

OTHER PUBLICATIONS

English Abstract of JP 60–32373, "Lateral Light Emitting Light Emitting Diode Array, Structure", Feb. 1985.
"An Image Device Using a Roof Mirror Lens Array", Toshiyuki Inokuchi, Ricoh Technical Report No. 13, May 1985, pp. 30–37, (Includes English Abstract).
Catalog from Nippon Sheet Glass Co. Ltd., Cat.SLA, vol. 2, Jul. 1985, pp. 2, 16–22.
English Abstract of JP 60–90784, "Printer Utilizing Light–Emitting Diode", May 1985.
English Abstract of JP 60–90783, "Optical Printer", May 1985.
English Abstract of JP 60–90782, "Printer Utilizing Light–Emitting Diode", May 1985.
English Abstract of JP 60–116479, "Printer Using Light–Emitting Diode", Jun. 1985.
English Abstract of JP 60–99673, "Printer Using Light Emitting Diode", Jun. 1985.
English Abstract of JP 60–99672, "Printer Using Light Emitting Diode", Jun. 1985.

* cited by examiner

Primary Examiner—Thinh Nguyen
(74) Attorney, Agent, or Firm—Oblon, Spivak, McClelland, Maier & Neustadt, P.C.

(57) ABSTRACT

A light emitting diode array head which focuses light on a screen such as a photoconductive drum. A plurality of LED chips each containing a row of LEDs emits light to a corresponding lens. The lenses correspond to the LED chips on a one-to-one basis and each of the lenses may be joined to form a unitary device. There are shields separating light from each LED chip from neighboring lenses. The LED chips and lenses prevent dispersion of the quality of light at the connecting portions of the lenses and obtain uniform beam shapes. To obtain uniform light patterns, the lenses are corrected for spherical aberrations and the LEDs of each LED chip are arranged to face a center of a corresponding lens.

21 Claims, 7 Drawing Sheets

LIGHT EMITTING DIODE ARRAY HEAD INCLUDING FOCUSING LENSES

BACKGROUND OF THE INVENTION

1. Field of the Invention

The present invention generally relates to a light emitting diode (LED) array head. The invention relates, more particularly, to an LED array head including focusing lenses for use in an optical writing system of an optical printer, a digital copying machine, a facsimile machine or other printing device.

2. Discussion of the Background

LED elements are more reliable for use under vibrations and noises than laser beam printers (LBP). They are also suitable for miniaturizing an optical head since an apparatus with an LED array head does not need a scanning mechanism such as a polygonal mirror as needed by an LBP using a semiconductor laser.

On the other hand, the LED elements have problems. For example, the quality of light from each element is dispersive and beam spot shapes are not uniform. The dispersed quality of light and the lack of uniformity of the beam spot shapes generate an uneven dot density of an output image such as an image containing black stripes. This unevenness becomes more remarkable in multi-valued images such as picture images. These problems generally originate from a unit magnification focusing element of a rod lens array.

FIG. 10 illustrates a conventional rod lens array which is made up of a plurality of rod lenses 104. These lenses may be made of fiber optic elements 104 which may be unit magnification focusing elements. The rod lenses 104 may be constructed as illustrated in FIG. 11 in which a fiber optic element 104 is illustrated as having a cladding 110 and a core 112. In FIG. 11, it is illustrated that the light reflects between the boundary of the cladding and the core. An alternative embodiment of the rod lens 104 is illustrated in FIG. 12 which shows a gradient index lens. In this Figure, it is seen that the light does not sharply reflect within the fiber optic lens 104 but the direction of the light is smoothly changed as illustrated in FIG. 12.

The disadvantages of the rod lens arrays including arrays which use gradient index lenses are caused by two problems. First, a dispersed light loss may occur at connecting portions between the rod lenses. This light loss occurs near the connecting portions due to a difference in a p itch of emitting elements and that of focusing elements. Second, it is difficult to uniformly converge light beams since flared light such as reflected light in a rod lens easily occurs.

FIG. 13 illustrates a conventional roof mirror lens array. In this system, light originating at 120, is reflected off of a mirror 122 through a lens 124, off of a roof mirror array 126, back through the lens 124, and off of a lower surface of the mirror 122 in order to form the image 128. This focusing system also has the above two problems.

SUMMARY OF THE INVENTION

Accordingly, an object of this invention is to provide a novel LED array head having a light emitting pattern which is uniform. It is a further object to have a small size LED array head.

These and other objects of the invention are accomplished by a light emitting diode array head including a plurality of LED chips, each containing a row of LEDs. The LEDs of each chip emit light to a corresponding lens. The lenses correspond to the LED chips on a one-to-one basis and each of the lenses may be joined to form a unitary device.

Shields may be used to prevent light from one chip from imparting on a neighboring lens in order to prevent dispersion of the quality of light in order to obtain uniform beam shapes. The lenses may be constructed to correct for spherical aberrations in order to obtain a planar focusing surface.

The LEDs may be arranged on each of the chips at varying angles so each of the LEDs directly faces the center of the lens so that the emitted light may be condensed in the center of the lens.

If the LED chips are separated such that the distance between the LEDs of the ends of different chips differ from the pitch within a chip, the system may be arranged so that the lenses magnify the light passing therethrough.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
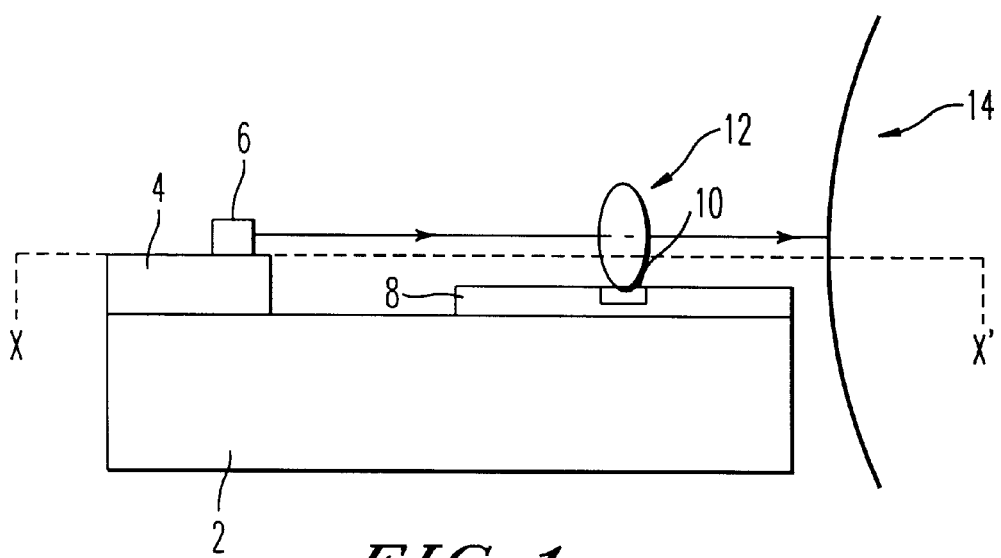
FIG. 1 is a cross-sectional view of an LED array head containing a LED, a lens, and a photoconductive roller.

Referring now to the drawings, wherein like reference numerals designate identical or corresponding parts throughout the several views, and more particularly to FIG. 1 thereof, there is illustrated a cross-sectional view of an LED array head constructed according to the present invention. In FIG. 1, there is illustrated a glass epoxy substrate 2 for supporting a LED chip 4 and a piece of aluminum 8. The LED chip 4 contains an array of LED light sources 6, one of which is illustrated in the cross-sectional view of FIG. 1. The piece of aluminum 8 in FIG. 1 has a groove 10 used to support a lens 12. Light emitted from the LED 6 passes through the lens 12 to a screen 14 which may be constructed as a photoconductive drum or other photosensitive surface.

Figure 2:
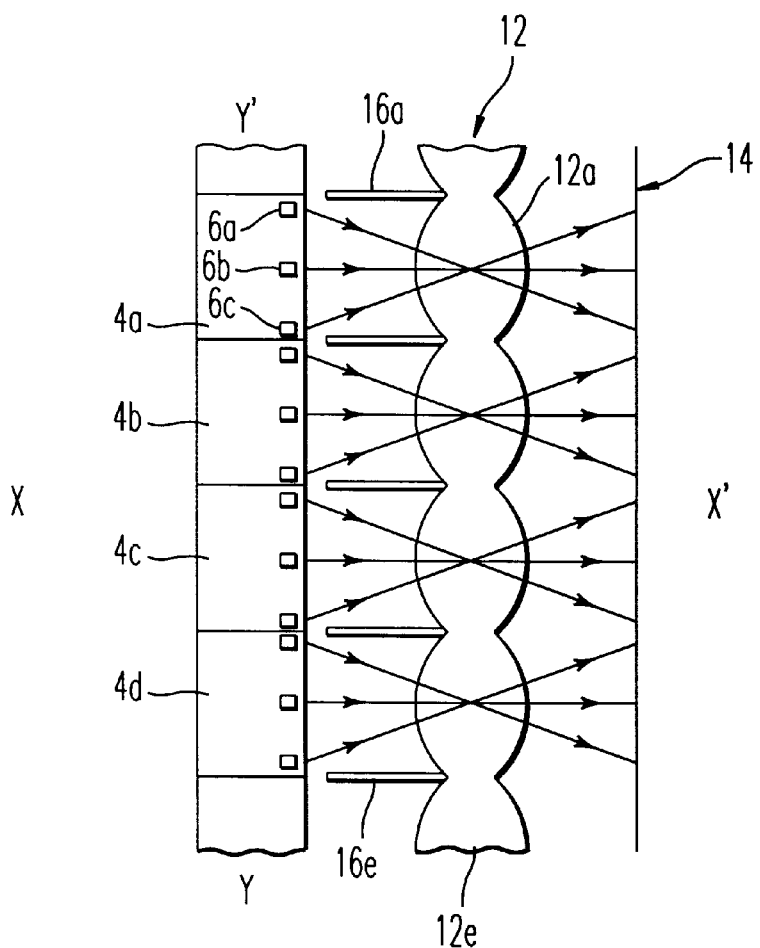
FIG. 2 is a top view of the device illustrated in FIG. 1 taken along line XX'.

FIG. 2 is a top view of the device illustrated in FIG. 1 taken along line XX' illustrated in FIG. 1. In FIG. 2, there are a plurality of LED chips 4a, 4b, 4c and 4d, each containing a plurality of LEDs 6a, 6b, 6c, etc. The lens 12 is made of a plurality of lenses 12a–12e which make up an optical focusing system.

In the present invention, each LED chip corresponds to one of the lenses. However, cross-talk of luminous flux may occur in which light from one of the LED chips passes through one of the lenses which does not correspond to the LED chip. Cross-talk may cause erroneous light to be applied to the screen 14 and also results in a loss of light. A shield 16 including shields 16a–16e illustrated in FIG. 2 is arranged between pairs of the LED chips 4 and the lenses 12. The shields reduce cross-talk between luminous flux from adjoining LED chips. The shields 16 may be constructed of any desired material and have any desired shape. It is preferable for the surfaces of the light shields 4 to be darkly colored (e.g., black) or to be roughened. This is because the surfaces of the light shields should absorb light which intrudes on an adjoining lens. The shields 16 may be attached to the lens array mechanically, for example, with glue. The shields 16 may also be united in a comb-like structure. For example, each of the shields 16a–16e may be connected to each other either at just a top portion or a bottom portion in a comb-like manner, or may by connected to each other both at the top and bottom. It is also possible to form the shields as one united body with the lens array 12.

Figure 3A:
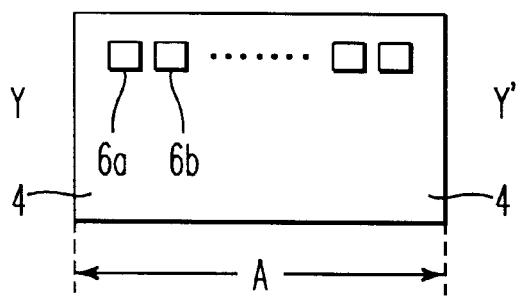
FIG. 3A illustrates one LED array chip 4 having a plurality of LEDs 6.

Details of the LED chips 4 are explained below with respect to FIGS. 3A–3C. The LED chips 4 are fabricated to include a substrate for example, gallium arsenide, having the LEDs mounted thereon. The size of the LED array chip has the dimension A (length) equal to 2.8 mm. The width of the chip 4 is 2.0 mm, and the chip may be several hundred $\mu$m high. Each of the chips 4 has 64 LEDs arranged in one row. However, the size and number of rows of the LED chip 4 may vary. For example, the number of LEDs may be 32. When there are 32 LEDs, the length of the chip will be smaller. The smaller the number of LEDs on the chip, the higher the yield rate of the manufacturing of the chip.

Figure 3B:
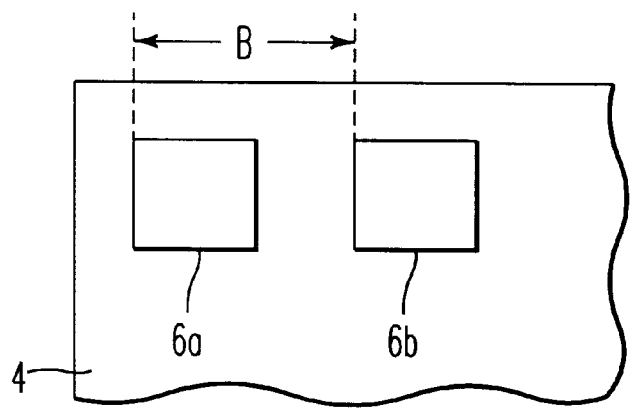
FIG. 3B illustrates the distance B which is the pitch of the LED array chip.

In FIG. 3B, the distance B which is the pitch or the chip is approximately 42.3 $\mu$m for a 600 dot-per-inch (dpi) chip. FIG. 3C is a cross-sectional view of the front of the chip taken along line YY'.

The optical focusing system of the invention includes a plurality of lenses 12a–12e, etc. The length of each of the lenses is approximately the same as the length of the LED chips 4. Luminous flux from the plural light emitting diode elements of each LED chip are focussed as a beam spot on the screen 14 such as a photoconductive drum through a corresponding lens 12. Since the lens 12 including the individual lenses may be manufactured as a single unitary device, it can be mass-produced at low cost. The lenses are preferably manufactured of a plastic such as polymethyl meta-acrylate (PMPA) or polycarbonate (PC), both of which are easy to mass produce and suitable for obtaining the desired precision.

Figure 4:
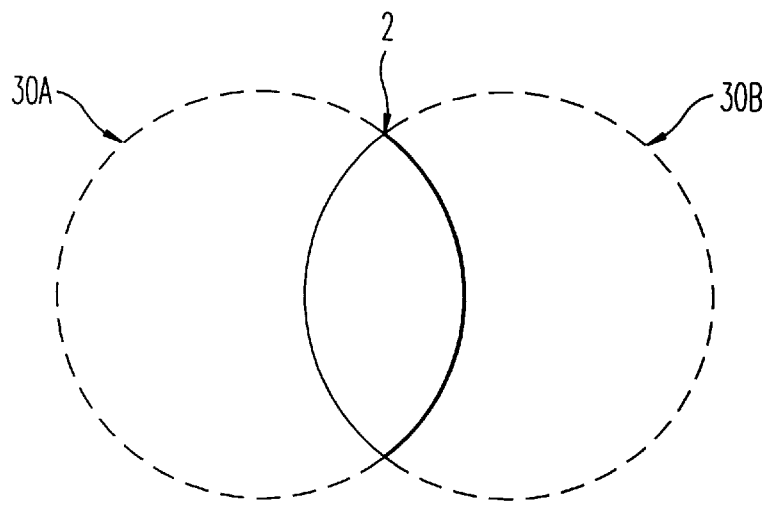
FIG. 4 illustrates the lens 2 having spherical surfaces.
Figure 5A:
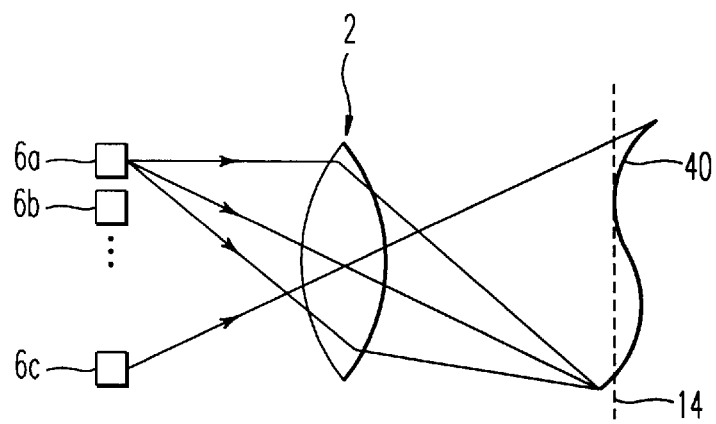
FIG. 5A illustrates a lens having spherical surfaces which has non-planar focusing distances.
Figure 5B:
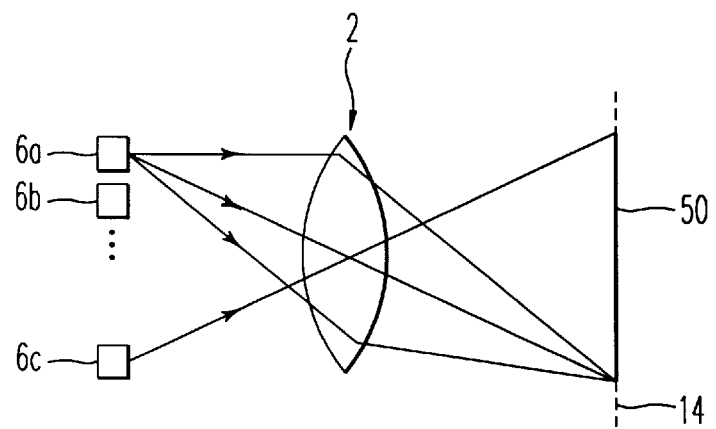
FIG. 5B illustrates a lens which is corrected for spherical aberrations having a planar focusing distance.

As illustrated in FIG. 4 which shows one lens 2, the lens has approximately spherical surfaces, as formed by the spheres 30a and 30b. However, if the surfaces of the lens are perfectly spherical, aberrations of the luminous flux may occur and the focussing position of light passing through the ends may have a non-planar shape as illustrated by the surface 40 illustrated in FIG. 5a. Accordingly, by making corrections to the surface of the lens and not making the lens perfectly spherical, as illustrated in FIG. 5B, the surface 50 illustrated in FIG. 5B at which the light is focussed can be achieved which is more desirable than the surface 40 illustrated in FIG. 5A.

Each of the lenses is adjusted to and corresponds with one of the LED chips 4. The connections of the lenses correspond to the connecting points or borders of the LED chips 4. This arrangement prevents dispersion of light and consequently a reduction in the quality of light at the connecting portions between the lenses and results in uniform beam spot shapes.

Figure 14:
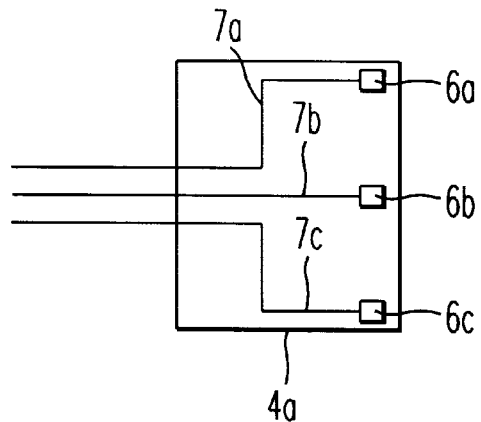
FIG. 14 illustrates a LED array and its wiring.
Figure 15:
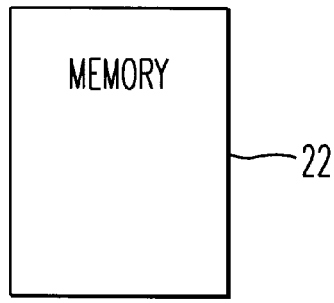
FIG. 15 illustrates a memory.
Figure 16:
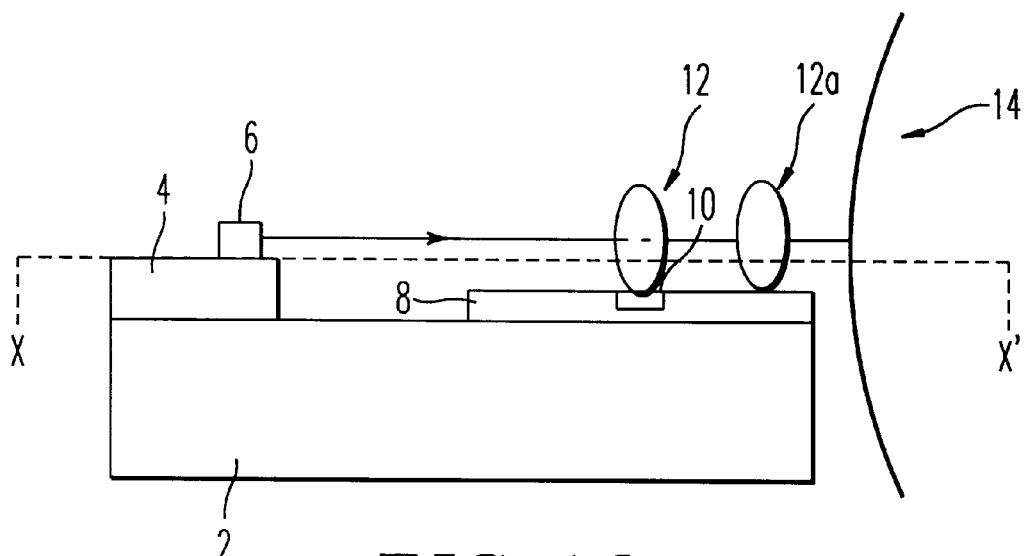
FIG. 16 illustrates a system having two lenses.

The lens 12 reverses the orientation of the light passing therethrough. As an example, in FIG. 2, while the light from LED 6b passes straight through the lens 12a, the light from LED 6a and the light originating from LED 6c are reversed after passing through the lens 12a such that the light from LED 6c is above (as illustrated in the Figure) the light from both LEDs 6b and 6c. Therefore, the LED chips or a control device must be constructed which intentionally reverses the signals being applied to the LEDs so that after the lenses 12 reverse the light, the light is in the desired position or orientation. One manner of reversing the dot data is to reverse the wiring to the electrodes of the LED chip 4. This reversal may be carried out at the time the LED chip is connected to a driving source using wire and a wire bonding method or may be carried out by reversing wires on a substrate such as a circuit board. FIG. 14 illustrates wires 7a, 7b, and 7c which may be reversed. As an alternative manner of reversing the pixel data which is to be written, the information may be manipulated in a memory before being transmitted to the LED chip. Such memory 22 is illustrated in FIG. 15. This may be performed by incorporating a memory into a LED driving circuit which is used to drive the LED chips 4. As a further alternative, more than one lens may be used so that the net effect of the lenses is not to reverse the pixel information. FIG. 16 illustrates a second lens 12a.

Figure 3C:
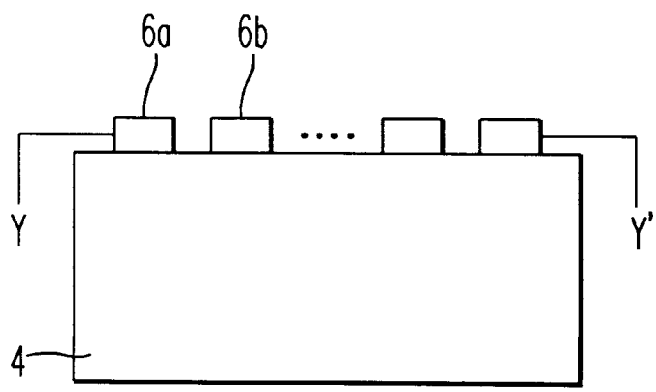
FIG. 3C illustrates a front view of one of the LED array chips 4 illustrated in FIG. 2 taken along line YY'.
Figure 6:
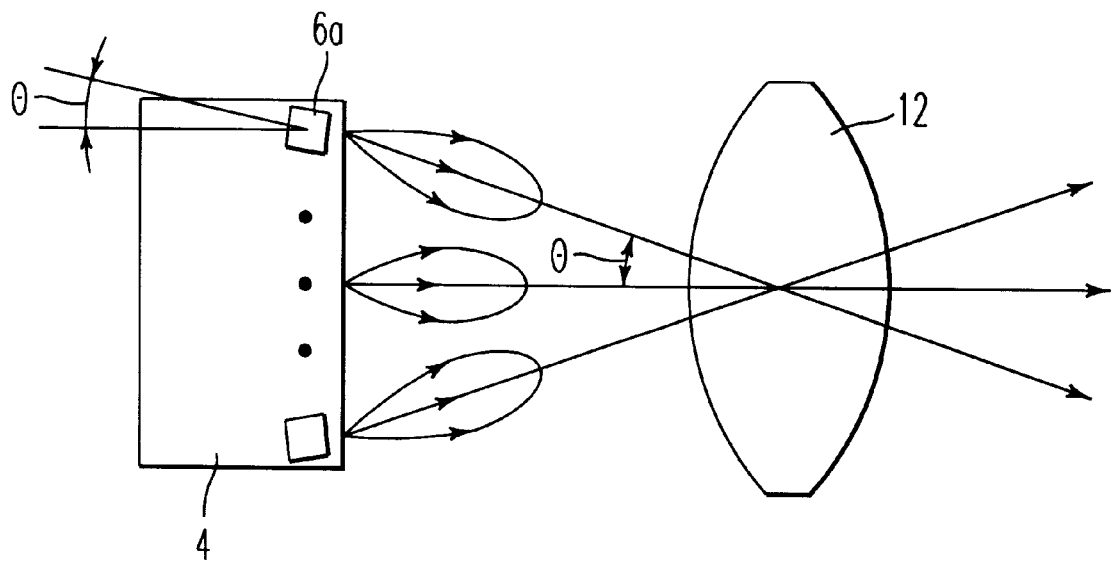
FIG. 6 illustrates the LEDs arranged on the chip 4 to face towards the center of the lens.
Figure 7:
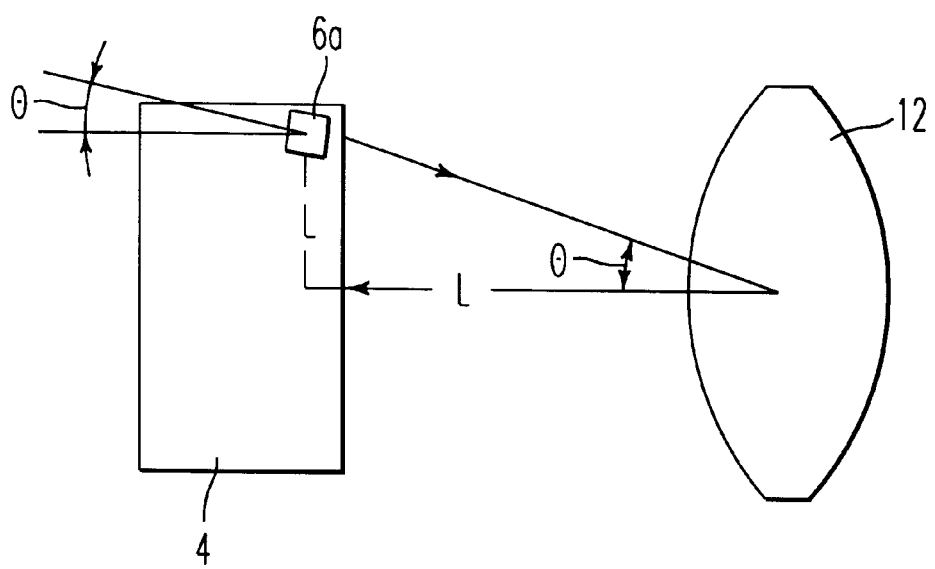
FIG. 7 illustrates the dimensions H and L which may be used to determine the angle Θ.

As an alternative to having the LEDs 6 arranged as illustrated in FIGS. 2–3C, the LEDs 6 may be arranged as illustrated in FIG. 6 so that the LEDs are aimed and direct their light towards a center of the lens 12. This allows the maximum luminous flux from each LED to be condensed in the center of the corresponding lens. The LEDs at the ends of the LED chip have the maximum angle Θ. The angle Θ and the angles for each of the other LEDs may be simply calculated using the distances H and L (see e.g., FIG. 7) from the center of the lens 12 according to the following formula:

$$\text{TAN } \Theta = H/L \tag{1}$$

However, the actual angle which is implemented depends on the circumstances. For example, if a reduction of size or precision of focussing is required, the angles should be as large as possible in order to make the device more compact. However, if low manufacturing is a priority, the maximum angle should be reduced in order to obtain a high yield of the LED chips.

According to this embodiment, the LED at the centermost portion of the LED chip 4 has an angle of approximately 0°, the end LEDs have a maximum angle, and there is a smooth change between the LEDs of the chip. As a result, the luminous flux from each LED is condensed in the center of the corresponding lens and it is possible to prevent dispersion of the quality of light in the LED chips.

Figure 8:
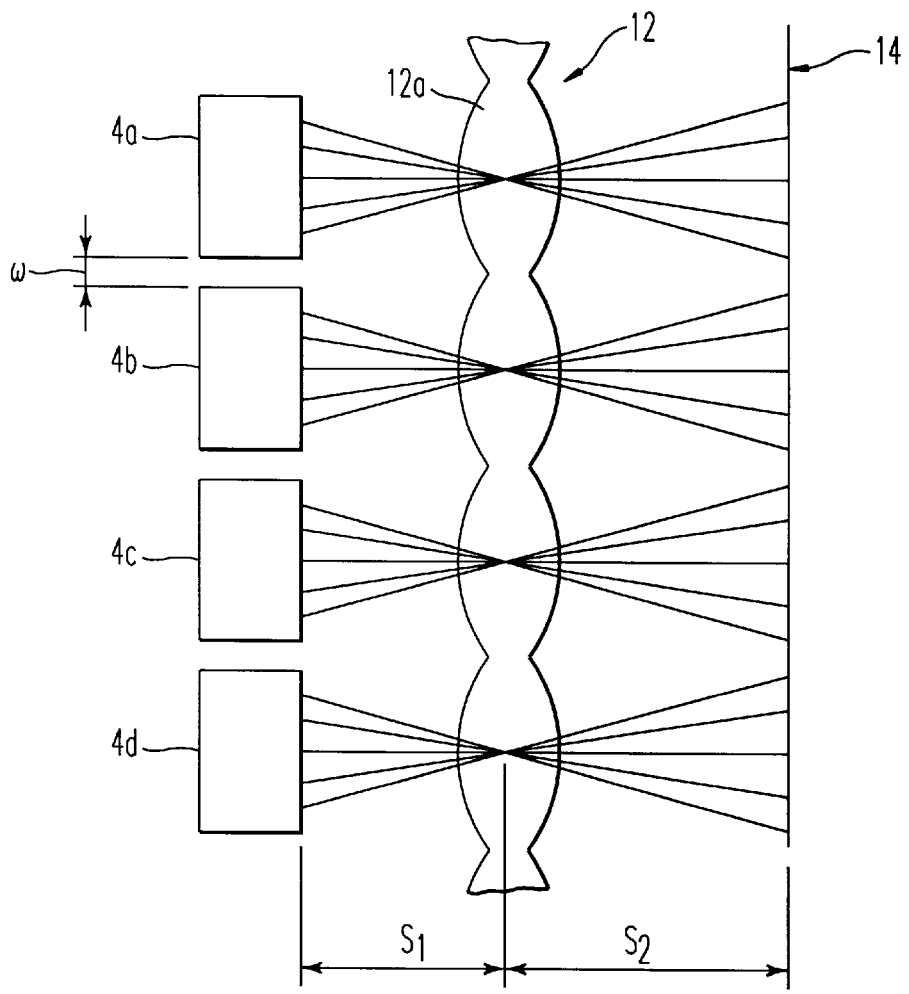
FIG. 8 illustrates an embodiment of the invention having a spacing ω between each of the LED chips 4.

FIG. 8 illustrates a space ω between each of the LED chips 4. While the end LEDs of neighboring LED chips may have a space therebetween, as illustrated in FIG. 8, it is important that the light striking the screen 14 does not have irregular spacing between the light which strikes the screen. This result is accomplished by obtaining a horizontal dot magnification rate β. β is arranged such that:

$$\beta = \frac{S2}{S1} \quad (2)$$

so that β is equal to or greater than one, where S1 is the distance between the LEDs and the middle of the lenses and S2 is the distance between the screen 14 and the middle of the lenses.

Figure 9:
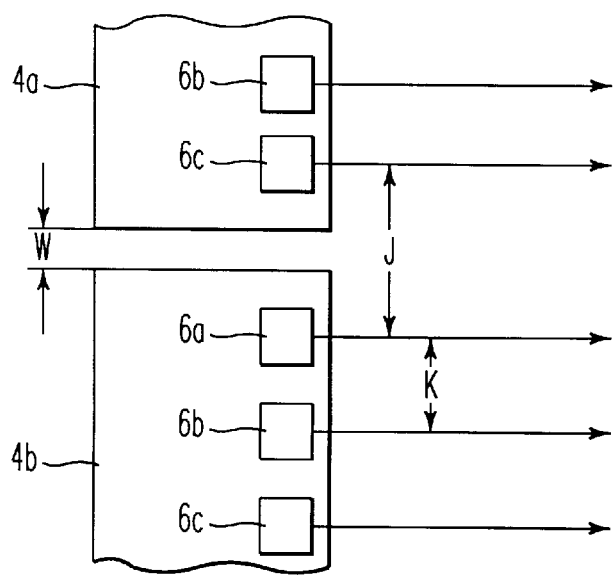
FIG. 9 illustrates the various distances between the LEDs and the LED chips.
Figure 10:
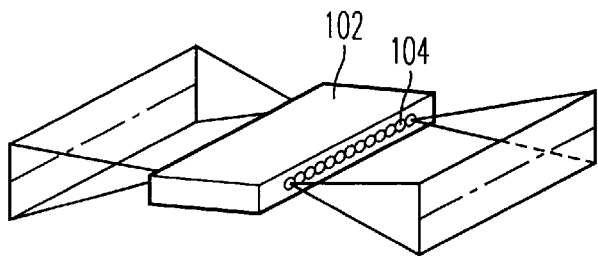
FIG. 10 illustrates a conventional rod lens array.
Figure 11:
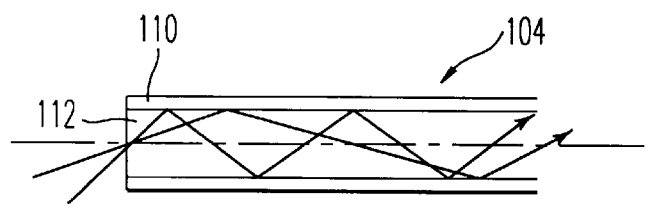
FIG. 11 illustrates a fiber optic lens which may be used in the rod lens array of FIG. 10.
Figure 12:
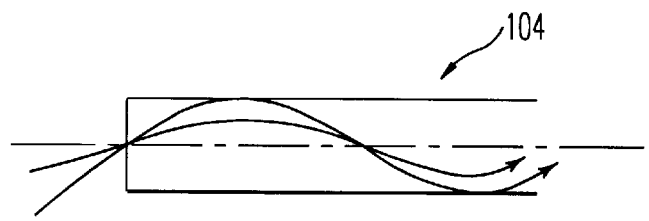
FIG. 12 illustrates a gradient index lens which may be used in the rod lens array of FIG. 10.
Figure 13:
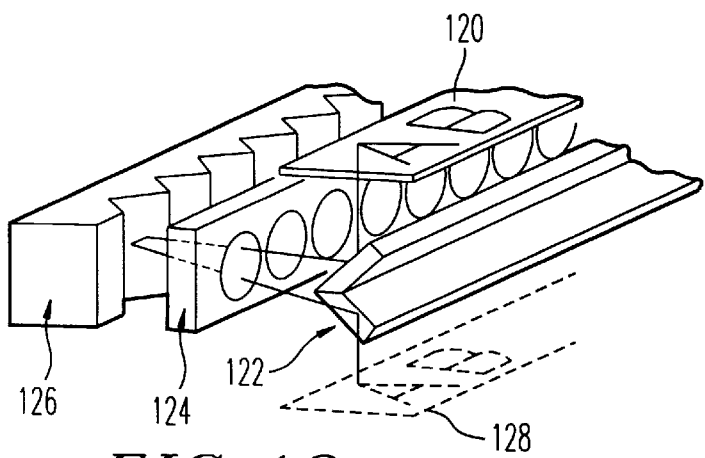
FIG. 13 illustrates a roof mirror lens system which can be used as an optical focusing system.

By making ω as small as possible, and consequently reducing the distance between the LED chips, the light being emitted from neighboring LED chips is closer together and the distance J (as illustrated in FIG. 9) between the end LEDs of neighboring LED chips is reduced. However, by reducing ω and consequently J, it is necessary to cut the ends of the LED chips as close to the end LEDs as possible. This may result in a lower yield of the chips due to chipping or jagged edges of the chips which may damage the end LEDs.

By knowing the value of ω, it is possible to determine the relationship between S1 and S2 in the following manner.

$$\omega = K\beta \quad (3)$$

where K is the pitch of the LEDs and β is the enlargement which is equal to S2 divided by S1. Accordingly, $$\beta = \frac{\omega}{K} \quad (4)$$

Therefore, $$\frac{S2}{S1} = \frac{\omega}{K} \quad (5)$$

The lenses illustrated in FIGS. 2 and 8 are basically the same. However, the lenses are manufactured in correspondence with ω, S1, S2, the pitch of the LEDs and any other features of the focussing system so as to condense the luminous flux from the lens properly in the center of the lens onto the screen 14. It is to be noted that the angles of the LEDs illustrated in FIG. 6 may be applied to the embodiment illustrated in FIG. 8.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. An image forming system, comprising:
   a plurality of light emitting diode (LED) arrays, each including a plurality of LEDs;
   a photoconductive surface which receives light from the LEDs; and
   a plurality of lenses which correspond one-to-one with the LED arrays which focuses light from the LEDs onto the photoconductive surface, said plurality of lenses being directly connected to form a unitary device,
   wherein the LEDs emit a a majority of light towards the corresponding lens in varying directions.

2. An image forming system according to claim 1, wherein each of said plurality of lenses has an unspherical surface to prevent aberrations.

3. An image forming system according to claim 1, further comprising:
   means for correcting for inversions of light caused by the plurality of lenses.

4. An image forming system according to claim 3, wherein the means for correcting includes means for optically correcting for inversions.

5. An image forming system according to claim 4, wherein the means for optically correcting includes a plurality of second lenses.

6. An image forming system according to claim 3, wherein the means for correcting includes means for electrically correcting for inversions.

7. An image forming system according to claim 6, wherein the means for electrically correcting includes wiring to the LEDs.

8. An image forming system according to claim 6, wherein the means for electrically correcting includes a memory which stores information which is to be output by the LEDs.

9. An image forming system according to claim 1, wherein each of said LEDs aim light towards a center of the lens.

10. An image forming system according to claim 1, wherein light emitted from the LEDs passes through the corresponding lens exactly one time.

11. An image forming system according to claim 1, further comprising:
    a plurality of light shields, each light shield located between pairs of said lenses.

12. An image forming system according to claim 1, wherein the lenses magnify light passing therethrough by a factor equal to or greater than 1.

13. An image forming system according to claim 1, wherein:
    the LEDs are oriented at varying angles so that the majority of light from each of the LEDs is directed towards a center of the corresponding lens.

14. An image forming system according to claim 1, wherein:
    the LEDs are arranged at the varying angles so that an orientation of the LEDs have a smooth change in angular orientation across the LED array thereof.

15. An image forming system according to claim 1, wherein for each of the LEDs:
    H is a distance from a center of one of said lenses along a first direction to said each of the LEDs corresponding thereto,
    L is a distance from a center of said one of said lenses along a second direction which is perpendicular to the first direction to said each of the LEDs,
    θ is an angle between a line along L from a center of said one of said lenses to the LEDs and a line from the center of said one of said lenses to said each of the corresponding LEDs, and
    said each of the LEDs satisfy an equation

TAN θ=$H/L$.

16. An image forming system according to claim 1, wherein:

the LEDs are arranged along a line which is parallel to an axis of rotation of the photoconductive surface.

17. An image forming system, comprising:

a light source means for emitting light including a plurality of light emitting diode (LED) arrays, each including a plurality of LEDs;

a photoconductive surface means for receiving light from the LEDs; and a lens means including a plurality of lenses which correspond one-to-one with the LED arrays for focusing light from the LEDs onto the photoconductive surface means, said plurality of lenses being directly connected to form a unitary device, wherein the LEDs emit a majority of light towards the corresponding lens means in varying directions.

18. An image forming system according to claim 17, wherein:

the LEDs are oriented at varying angles so that the majority of light from each of the LEDs is directed towards a center of the lens.

19. An image forming system according to claim 1, wherein:

the LEDs are arranged at the varying angles so that an orientation of the LEDs have a smooth change in angular orientation across the LED array thereof.

20. An image forming system according to claim 17, wherein for each of the LEDs:

H is a distance from a center of one of the lenses of the lens means along a first direction to said each of the LEDs, L is a distance from a center said one of the lenses of the lens means along a second direction which is perpendicular to the first direction to said each of the LEDs, θ is an angle between a line along L from a center of said one of the lenses of the lens means to the LEDs and a line from the center of said one of said lenses to said each of the corresponding LEDs, and said each of the LEDs satisfy an equation TAN θ=H/L.

21. An image forming system according to claim 1, wherein:

the LEDs are arranged along a line which is parallel to an axis of rotation of the photoconductive surface means.

* * * * *

UNITED STATES PATENT AND TRADEMARK OFFICE
CERTIFICATE OF CORRECTION

PATENT NO. : 6,330,017 B1  
DATED : December 11, 2001  
INVENTOR(S) : Suzuki

Page 1 of 1

It is certified that error appears in the above-identified patent and that said Letters Patent is hereby corrected as shown below:

<u>Title page,</u>
Item [45], and the Notice information should read:
-- [45] Date of Patent: *Dec. 11, 2001 --
-- (*) Notice: This patent issued on a continued prosecution application filed under 37 CFR 1.53(d), and is subject to the twenty year patent term provisions of 35 U.S.C. 154(a)(2).
Subject to any disclaimer, the term of this patent is extended or adjusted under 35 U.S.C. 154(b) by 953 days. --

Signed and Sealed this

Thirtieth Day of April, 2002

Attest:

Attesting Officer

JAMES E. ROGAN
Director of the United States Patent and Trademark Office